United States Patent [19]

Fishgal

[11] Patent Number: 4,619,406

[45] Date of Patent: * Oct. 28, 1986

[54] HYDRAULIC SYSTEM AND METHOD OF IMPROVING THE WORKING PROPERTIES THEREOF

[75] Inventor: Semyon I. Fishgal, Winnipeg, Canada

[73] Assignee: Can-Am Engineering Corporation, Cedar Falls, Iowa

[*] Notice: The portion of the term of this patent subsequent to Aug. 18, 1998 has been disclaimed.

[21] Appl. No.: 953,705

[22] Filed: Oct. 23, 1978

Related U.S. Application Data

[63] Continuation of Ser. No. 753,419, Dec. 22, 1976, abandoned.

[51] Int. Cl.[4] .................. B02C 19/06; B01J 13/00
[52] U.S. Cl. ........................... 241/5; 184/6.21; 184/6.22; 184/6.23; 188/264 B; 241/30; 241/40; 252/303; 252/314
[58] Field of Search ............... 252/303, 314; 184/6.21, 184/6.22, 6.23; 188/264 B; 241/5, 30, 40

[56] References Cited

U.S. PATENT DOCUMENTS

| | | | |
|---|---|---|---|
| 1,200,560 | 10/1916 | Williams | 252/314 X |
| 1,496,858 | 6/1924 | Knollenberg | 252/312 X |
| 1,738,565 | 12/1929 | Claypoole | 252/314 |
| 2,477,096 | 7/1949 | Silcox | 252/303 X |
| 3,356,182 | 12/1967 | Robinson et al. | 184/6.21 |
| 3,400,785 | 9/1968 | Allen | 233/28 X |
| 3,728,280 | 4/1973 | Sauer et al. | 252/314 |
| 3,997,468 | 12/1976 | Maljushevsky et al. | 252/314 |
| 4,284,245 | 8/1981 | Fishgal | 184/6.21 X |

OTHER PUBLICATIONS

E. S. Ventsel et al.: Improving The Properties of Lubricating Oils by Hydrodynamic Atomizers in Lubrication Systems, "Russian Engineering Journal", vol. L11, No. 10, pp. 18-20.

Primary Examiner—Richard D. Lovering
Attorney, Agent, or Firm—Zarley, McKee, Thomte, Voorhees & Sease

[57] ABSTRACT

A method of improving the working properties of fluid systems, e.g., hydraulic, lubrication, fuel, etc. The method lies in hydromechanical destroying or cavitation eroding the solid contaminants of the fluid, directly in the system or separately; dispersing of them into and retaining them within the fluid; releasing the gaseous and liquid contaminants, driving them off; and the emulsification of the fluid. As a side action, feeding of the pump of the fluid system is improved as well.

12 Claims, 25 Drawing Figures

HYDRAULIC SYSTEM AND METHOD OF IMPROVING THE WORKING PROPERTIES THEREOF

This is a continuation of application Ser. No. 753,419 filed Dec. 22, 1976, now abandoned.

BACKGROUND OF THE INVENTION

This invention relates to a method of improving the working properties of fluid system, e.g., hydraulic, lubrication, fuel, etc., which are contaminated mainly during operation with the cause of the contamination being unavoidable.

It is well known that the reliability and the longevity of both fluid systems themselves (hydraulic and fuel) and the machines they take care of (the lubrication systems of engines, compressors and others), in many respects, depend on the working properties of the used fluid.

These properties are determined by the presence of the solid, gaseous and liquid contaminants in the fluid, the fineness of the latters and the state of their dispersion.

The solid contaminants are the products of wear (metal filings, rubber, etc.) and oxidation of both the details (e.g. bearings, gears, seals) and the working fluid itself, or are the dust (the most destroying contaminant) from the atmosphere.

The intensity of the contamination from the atmosphere, e.g. in hydraulic systems (especially those of farm, road-making, construction and the like machinery), depends on fluid volume oscillations in their tanks when operating. These oscillations are basically dictated by the work of their hydraulic cylinders and accumulators.

The matter is not only that the solid contaminants are abrasive, cause wear and decrease (in many times) the term of fluid unit service, but they may wedge movable details (especially the plunger ones) and be the cause of the inoperativeness of automatic controls. As much as to hydraulic systems, this is true for fuel-feed engine systems, especially those of fuel-feed diesels and gas turbines. Of the latters, the problem particularly arises in road-vehicle gas turbines because the parts of such systems are many times smaller (in comparison with those of aircraft) with openings susceptible to blockage through dirt ingress and carbon deposit formation.

The gaseous contaminants (air, carbon dioxide, sulfur dioxide, water vapor, etc.) are absorbed from the atmosohere (as above) or from their internal source (e.g. incomplete combustion processes).

The unsolved gaseous contaminants deteriorate the pliability of fluid systems, their triggering, stability, and may cause inoperativeness.

Some gaseous contaminants (e.g. sulfur dioxide) form acids (causing corrosion) with water. Besides, oxygen solubility-in-fluid being higher than that of atmosphere air, the dissolved one contains 40–50% more oxygen. This intensifies the oxidation of the fluid and the metal details, and destroys the rubber ones.

Also, the gas forms foam decreasing oil lubrication ability and causing the corrosion of metal details, oxidation and other chemical reactions in the oil (because of bigger interface and more oxygen content). The stable foam, in time, forms viscous contaminants depositing on the detail surfaces. The forming of foam increases sharply when water is present (even at only 0.1%).

Gas is always present in fluids, at least in a dissolved form, and usually does not affect fluid mechanical properties. But vibration, decreasing pressure and heating give the gas off (even with foaming) and form the inoperative mixture instead of the former solution fitted for work. That is why the problem especially arises in fluid systems on vehicles when the systems remaining inoperative are subjected to jarring and vibration. This may aggravate starting such a hydraulic system or the fuel system (if there is an auxiliary engine).

Of fuel systems, the air problem is of particular importance in diesel ones, where the fuel is relatively viscous and therefore, there is the tendency for air to entrain into the fuel and to terminate fuel delivery to the combustion chambers.

As to liquid contaminants, the main representatives of those are water and fuel. The water in its vapor form comes into the "breathing" tank (as described above) and condenses when the temperature drops. The fuel may come into the lubrication system from combustion chambers or because of leakage, etc.

Because fuel is volatile, the effects of it are like those of the gaseous contaminants. The effect of the water contaminant has been described above.

The main known methods of fluid decontamination are the continuous removing of contaminants from the fluid by means of straining, filtering, absorption, gravitational displacement, magnetic, electrostatic and centrifugal separation, evaporating in atomized state, etc. Independent continuous or periodic purification is employed with full-flow and bypass (5–20% of the flow).

The mentioned methods and appropriate means are described in many sources (U.S. Pat. Nos.: 2,215,756; 2,268,653; 3,154,087; 3,233,652; 3,329,194; 3,356,182; 3,444,871 and others).

Common to all the known methods of decontamination is the quest for removing all contaminants from the fluid. Being unable to do so, filtration, for example, is assumed to be the most qualified if the size of the filtrating material calibration channel is less than the half of the minimum clearance in the sliding pair. Still, being difficult, it does not go beyond the full clearance. Besides, the fine mesh filters may clog and, in some areas, even become a repository for geological growth.

SUMMARY OF THE INVENTION

The object of this invention is to devise a simple and practical method not only for the same purpose (eliminating the harmful effects of contamination) as the known ones, but for improving fluid working properties too (e.g. in fluid circulation systems contaminated during operation, the cause of contamination being unavoidable), and even the system components themselves.

Other objects are to increase the longevity of the fluid and system units, their reliability, to improve the antifriction properties of rubbing components, to improve feeding of the system pump, to devise the best regimes of fluid treatment, etc.

The principal distinguishing characteristic of this invention is that the fine solid contaminants are not driven off, but are destroyed by means of either hydromechanical breaking down, or ultrasonic erosion or the cavitation one directly in the working system or separately. Also, they are intentionally retained in the fluid in the dispersion state (obtained by the same methods).

In doing so, the solid contaminants were not only neutralized, but are converted into useful particles. At the same time, the mentioned treatment is accomplished in such a manner that volatiles are drawn off the fluid.

It can be said with confidence that said intentional retention of the fine particles in the working fluid in a dispersion state is not quite as absurd as it may seem. Taking the new view of this retention it has been found that the dispersed particles are very useful.

They substantially improve the antifrictional properties of the rubbing components by means of:
1. Filling the cavities of the wearing or defective surfaces;
2. Smoothing and restoring the latters;
3. Extending the actual contact area;
4. Increasing heat transfer between the surfaces;
5. Reducing pressure between the latters, the influence of microseizure and other undesirable frictional effects.

Also, these particles having a relatively large surface absorb the oxidation products and increase the electric conductivity of the fluid. Consequently, the electrostatic component of wear and electrostatic electricity accumulation are decreased. The latter, also, adds the fire safety. Besides, the oil quality is improved in response to silent discharges (because of the metal particles). In engines, also, the deposition of carbon and varnish decreases.

Thus, this method allows not only to diminish as it is too rigid requirements to the filtration, but to improve the system as a whole.

Among other things, in one process only, it is possible to eliminate, also, gaseous and liquid contaminants and accessorily to improve pump feeding and emulsions: water-oil ones (fire-resistant hydraulic liquids and the lubricants of large two-stroke marine engines), cutting fluids, cooling lubricants, etc.

It should be taken into account that the metallic particles may act as a catalyst for oil oxidation and form tarry substances, when the metal of the rubbing parts and the oil are inappropriately selected.

DESCRIPTION OF THE PREFERRED EMBODIMENT

The initial stage of this method for improving the working properties of fluid systems is mechanical destroying or cavitation eroding the solid contaminants of the fluid.

For the mechanical destroying, it is possible to use the mutual collision of the solids (themselves or against a solid surface), cavitation of the fluid or both of these phenomena simultaneously, or cutting by the port edges in the small clearance of the pair sliding at high speed. These can be readily accomplished either on a continuous basis or a cycle one.

After destroying, the solid contaminants are intentionally retained in the fluid in a dispersed state, which is achieved by hydromechanical methods. If the quantity of the dispersed particles is more than necessary for the dispersion, the residue settles down into a settler-storer (which is usually available in the filters or the tank of the fluid system) and is removed at the routine maintenance of the system.

The mentioned mutual collision can be created by means of:
1. Speeding-up the contaminants in the fluid jet, the solid surface being stationary;
2. Speeding-up the surface (usually by an ultrasonic transducer), the fluid being stationary;
3. Speeding-up both the contaminants and the surface;

4. Speeding-up the contaminants in, at least, two mutual colliding jets, the solid surface being (a) absent; (b) stationary; or (c) speeding-up.

Figure 1:
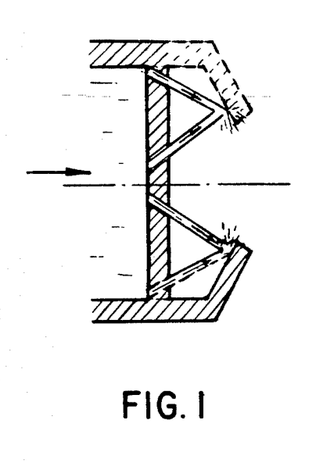
FIG. 1 is the schematic diagram of injection impingement.

These methods, besides those with the speeding-up wall, are diagrammatically shown on FIG. 1 by means of full and dash lines. Undoubtedly. there are a lot of other ways to inject the fluid in such a manner that the contaminant streams impinge upon each other or upon the wall. The impingement can aid not only destroying and dispersing the solid contaminants as obtained atomization can be used for removing other contaminants (this will be shown below).

The mechanism of dispersion and emulsification by the jet lies in its tendency to entrain large volumes of surrounding fluid, to move the solid and liquid particles, to create turbulence, to suspend them and to blend fluids.

The effect of emulsification can be used for improving emulsions (water-oil fire-resistant hydraulic liquids, cutting fluids, cooling lubricants, etc.).

A hydromechanical device with the fluid jet impinging upon the wall (FIG. 2) consists a body 1 (that can be attached, e.g the return fluid line in a fluid tank, a delivery line, etc.) on which a nozzle 2 and a tip 3 with a rigid plate 4 and slots 5 are screwed. The distance between the nozzle 2 and the plate 4 is fixed by a locknut 6.

Figure 2:
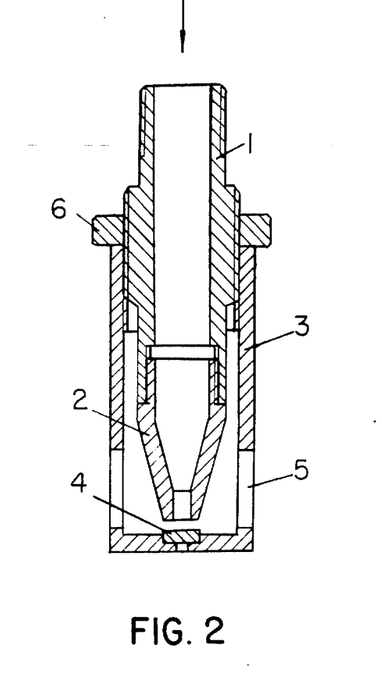
FIG. 2 is the design of the submerged hydromechanical destroying device with the fluid jet impinging upon a stationary solid surface.

The fluid is delivered under pressure to the body 1, accelerated in the nozzle 2 and impacts at high speed against the plate 4. This impact breaks down the solid contaminants in the fluid flowing out through the slots 5.

For minimizing turbulence and radial flow and obtaining the clean coherent jet, the nozzle 2 is polished and all changes in contour are rounded off. The nozzle design, pressure level, jet velocity, volumetric flow rate, surface condition, the standoff distance (that between the nozzle and the plate) are important for obtaining steady jets.

Existence of two thresholds of velocities (or pressure drops) should be expected: the bottom one below which destroying does not occur for most contaminants, and the upper threshold beyond which little destroying effect is gained.

There are many ways in which the above unit may be mounted, varying according to the application, and this does not exclude the use of usual purification devices (filters, centrifuges, etc.).

Figure 3:
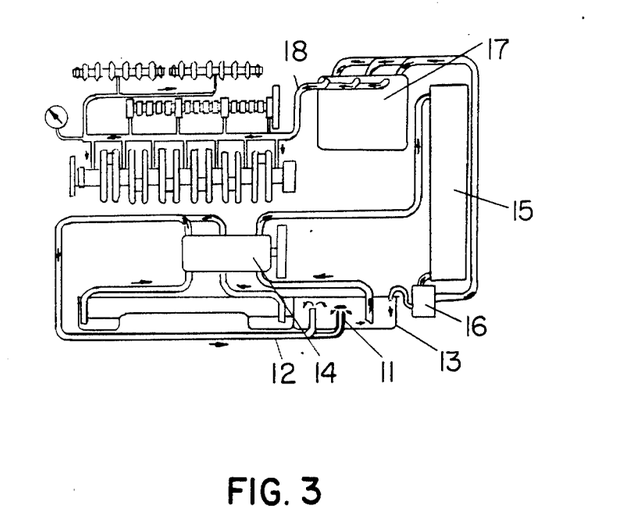
FIG. 3 is a schematic diagram illustrating the installation of the above device into an exemplary lubrication engine system with a dry sump.

On FIG. 3, as on the others, the installation of the like devices is shown by way of illustration, but not of limitation, in an exemplary lubrication engine system with a dry sump. Like, but not necessarily identical, parts are identified by common reference numerals in the different figures.

The system contains the device 11 installed into a bypass return line 12 on an oil tank 13, a pump 14 and 14A an oil cooler 15 with a bypass valve 16, filter installations 17 and 17A and a main line 18.

Oil flows down into a recess in the front and rear parts of the crankcase and is continuously pumped by the pump 14 through the oil cooler 15 and the filter installation 17 into the main line 18. Through the device 11, 15-25% of the flow passes by.

In a lubrication engine system with a wet sump (not shown on the drawings), the device 11 can be installed on the delivery side of the system. In this case, the oil flows through the device to the crankcase.

Because the principal objective of the invention and one of the numerous possible means of its performance have been explained, it is expedient to take a view of the results, before turning our attention to other possible means and installations.

Figure 4:
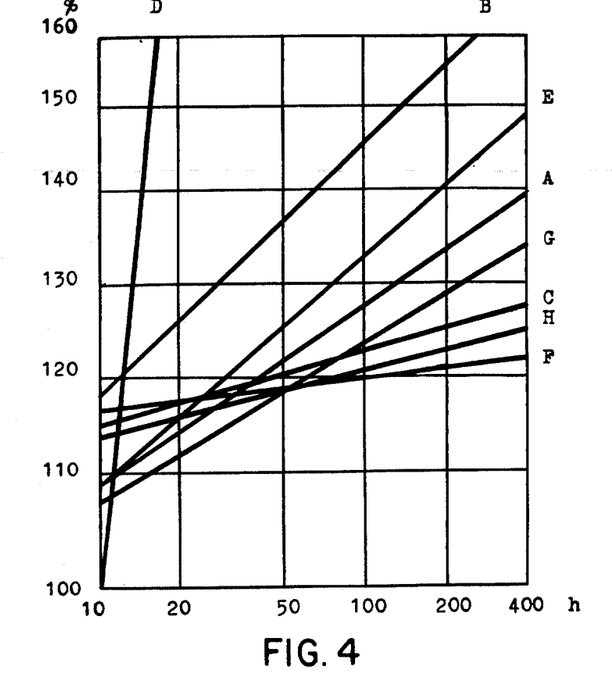
FIG. 4 is a graph with the percentage lines showing the improvement of the working properties of a diesel lubrication system for the factors of acidity (line A), alkalinity (line B), sliming on filters (line C), metal contaminants (line D), wear (line E), friction (line F), electroconductivity (line G), and deposition of carbon and varnish (line H), the device being installed directly into the system.

The percentage of improving the working properties of engine lubrication systems by means of destroying and dispersion of the solid contaminants directly in the system at 20% of the full flow is shown on FIG. 4.

At the usual operating conditions in lubrication lines (4–7 kgf.sm$^{-2}$ pressure and 60°–90° C. temperature) this method improves the factors of acidity (characterizing the degree of oil oxidation) on 10–40%, alkalinity (characterizing undepleted additive)—20–60%, sliming on the filters—15–30%, metal contaminants (characterized by us as a positive phenomenon)—up to 400%, wear—on 25–35%, friction—20%, electroconductivity—30%, the deposition of carbon and varnish—20%, the size of the solid particles is quartered (from 10–15 mkm). These data based on 400 hours work of the same oil show the possibility of lubrication oil to serve in engines at least two times longer.

The lines A–H can be found by means of comparison of the working properties of untreated and treated fluids operating in similar conditions.

The acidity and the alkalinity can be determined by known methods, e.g. by measurement of electrical potential or by means of indicators, comprising a class of weak acid or basic compounds which change color by reaction with the fluid.

Sliming on filters is compared by weighing, metal contaminants—by settling and weighing, friction—by tribometers.

It should be noted that the oil film can become nonconducting if its thickness is slightly increased. This is characterized by increasing the film resistance of several orders. That is why the electrical conductivity of thin fluid films can be studied by means of fluid filling the gap between the tips of a micrometer, applying a voltage to the tips and measuring the gap at the same volt-ampere characteristic, which can be recorded, for example, on the screen of an oscillograph. Such a result is shown on FIG. 4 (line G).

Antiwearing properties can be assessed by the indentations on the sliding surfaces and by measuring their wear. The deposition of carbon and varnish can be measured in the same way.

Figure 5:
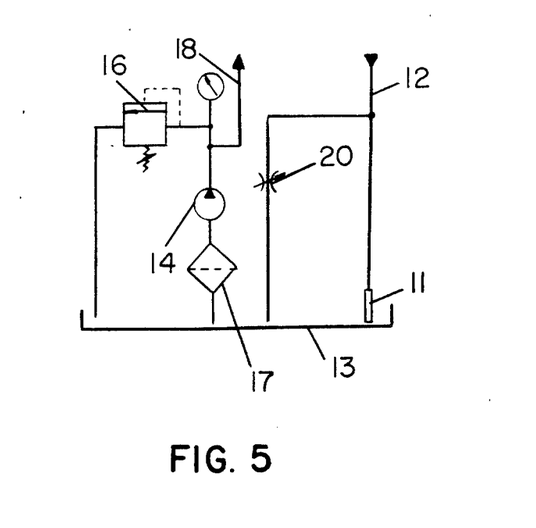
FIG. 5 is a schematic diagram illustrating the installation of the device into an exemplary hydraulic system.

In hydraulic systems, the alternate method of partial flow of the working fluid can be applied (FIG. 5).

A variable orifice 20 limits the volume of fluid that can return directly to a tank 13 through a return line 12. Excessive return flow is delivered through the device 11.

Figure 6:
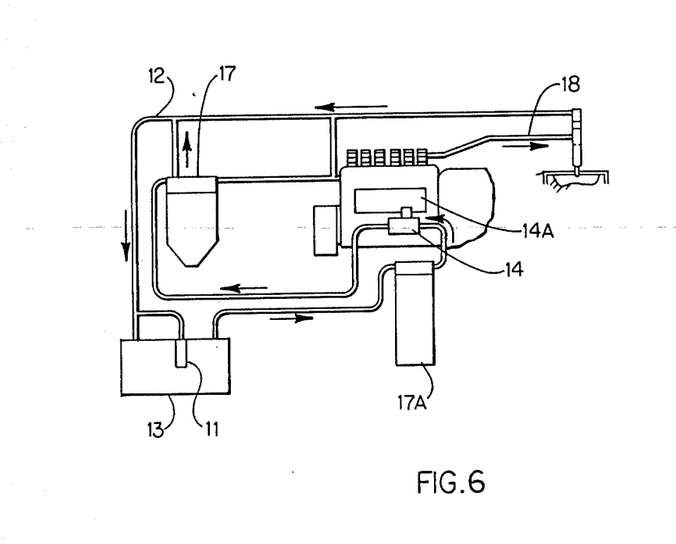
FIG. 6 is a schematic diagram illustrating the installation of the device into an exemplary fuel-feed system of a four-stroke diesel.

In a fuel-feed system of a four-stroke diesel (FIG. 6), the fuel from a tank 13 is pumped out by a pumps 14 and 14A through a filter installations 17 and 17A into a main line 18. Excessive fuel is returned through a return line 12 and the device 11 into a tank 13.

The destroying-dispersing device can be a separate arrangement (FIG. 7) composed of the device 11, a tank 13, a pump 14, a return line 12 and an inlet 22.

Figure 7:
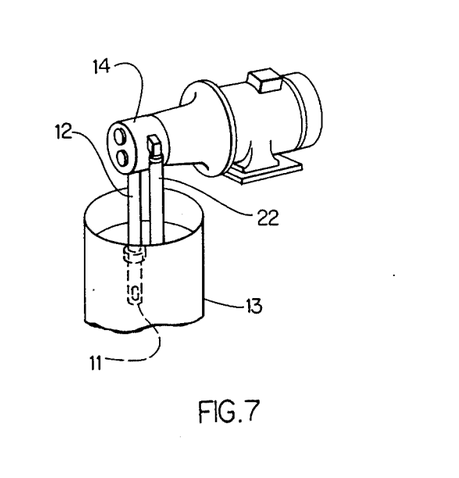
FIG. 7 is the view of a separate arrangement with the above device.

The fluid to be improved is poured out into a tank 13 and circulates through the circuit: a tank 13—an inlet 22—a pump 14—a return line 12—the device 11—a tank 13.

Figure 8:
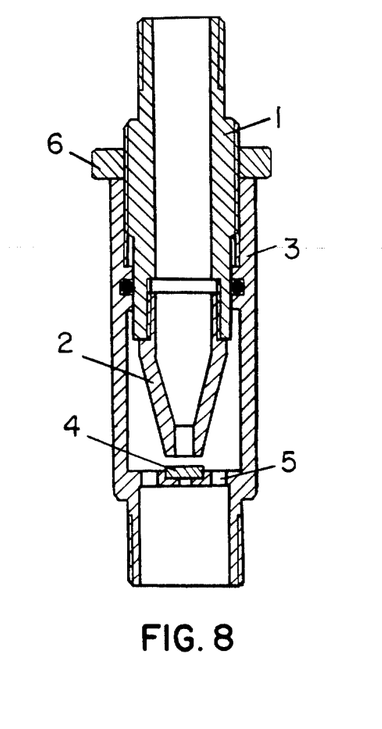
FIG. 8 is the design of the above device of unsubmerged type.

In many cases, from operational considerations. the device is better to be of an unsubmerged-into-tank type. This is easily achieved by sealing the body 1 and changing the outlet (FIG. 8).

Figure 9:
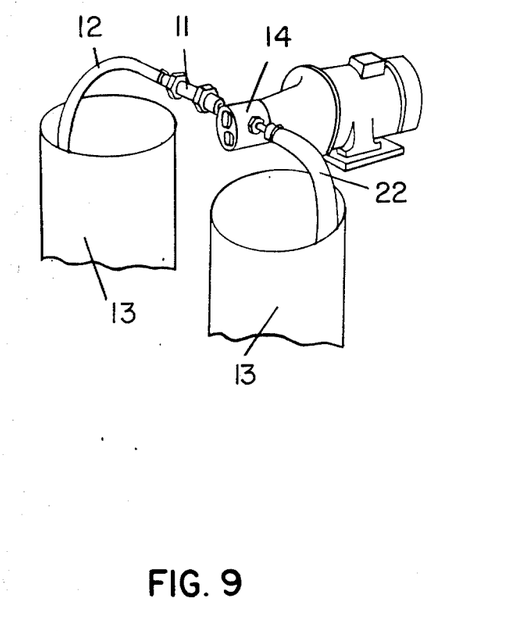
FIG. 9 is the view of a separate arrangement with the above device (on FIG. 8) operating with two fluid tanks.
Figure 10:
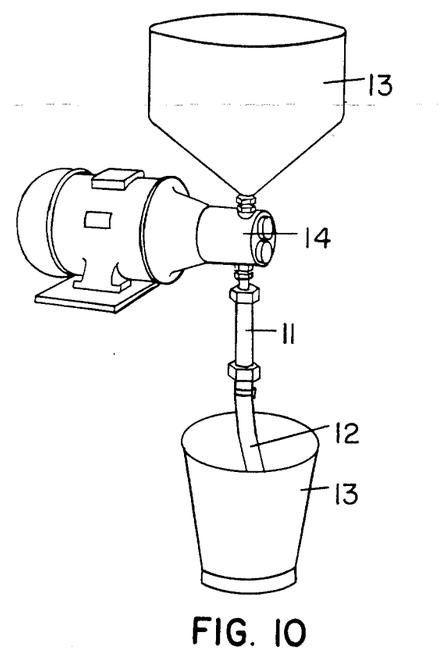
FIG. 10 is the same as above with the special overhead funnel.

The destroying-dispersing device can also be installed into a separate arrangement operating with two tanks (FIG. 9) or with the special overhead funnel (FIG. 10).

In the first case, the fluid to be improved is pumped out of one tank 13 into another through an inlet 22, a pump 14, the device 11 and a return line 12; in the second case, fluid flow is the same, except there is no inlet pipe.

Figure 11:
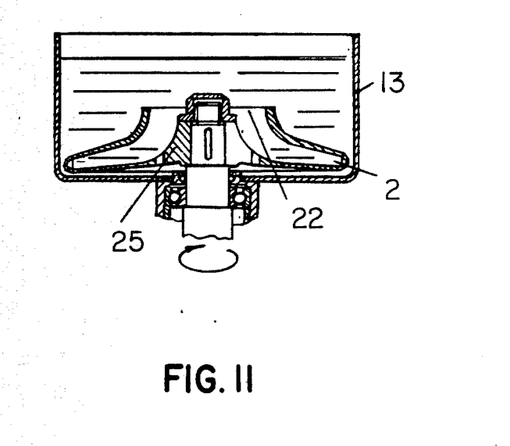
FIG. 11 is the design of a separate arrangement of a centrifugal type.

In many cases, it is more expedient to install a nozzle 2 into an impeller 25 in a tank 13 (FIG. 11). With this device no pump is necessary.

When the impeller 25 is rotating, the fluid from its inlet 22 is thrown out of the nozzle 2 under centrifugal force. The jet leaves the nozzle and breaks itself down against the wall of the tank.

Figure 12:
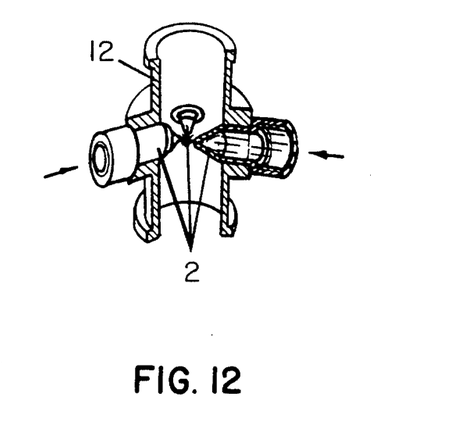
FIG. 12 is the design of a device with mutual colliding jets.

To avoid the wearing action of the jet on an impinged plate three nozzles 2 are radially installed into a return line 12 (FIG. 12). The jets from the nozzles mutually collide and the solid contaminants are destroyed.

It is easy to consider a pulsating jet to be more effective as it gives time to remove the reflected off-the-wall stream and since a solid contaminant surface is rough with cracks and crevices, the fluid is trapped in the enclosed regions and breaks them down at increasing pressure. Besides, in systems with small consumption, it is possible by means of pulsating the jet to enlarge the too small orifices, which are required to provide the proper jet velocity and are susceptible to blockage through dirt ingress, carbon deposit formation and obliteration.

The fluid system is subjected to minor pressure oscillations about the mean pressure level with the significant ones being forced at the nozzle, if the forcing frequency of the volumetric displacement is one of the resonating frequency.

Of course, there are many ways to pulsate the jet. One of them, the destroying device combined with the pulsating valve, is shown on FIG. 13.

Figure 13:
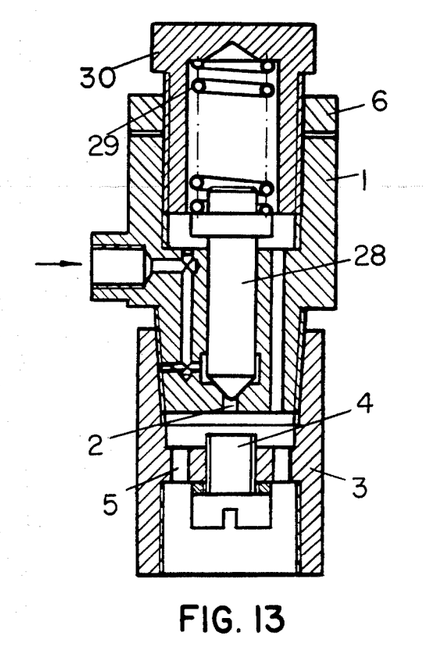
FIG. 13 is the design of a device with a pulsating valve.

A body 1 provided with a nozzle 2, a tip 3, a screw plate 4 and slots 5 contains a plunger 28 with a spring 29. The latter is limited with a threaded retainer 30 and a locknut 6.

In the starting position, the valve is closed. When the fluid is supplied, a plunger 28 compresses the spring 29 and opens the nozzle 2, the jet breaks itself down against a plate 4 and comes out through the slots 5. At this time, pressure in the valve chamber drops and the spring, again, closes the valve.

The valve parameters, providing its operating in the self-oscillating regime, can easily be considered from investigating the equations of the plunger movement, if we assume absence of leakage, flow-continuity disturbance at the inlet, dry friction, plays, wave processes in the drain line, resistance in the pipes, deformation of walls, change of thermal conditions, gravity forces and fluid compressibility.

At this $$m \frac{d^2x}{dt^2} + f\left(\frac{dx}{dt}\right)^2 + zx - pF = 0; \quad (1)$$

$$\frac{V}{E} \cdot \frac{dp}{dt} + Q\frac{x}{x_o} + \frac{dx}{dt} = 0 \quad (2)$$

where x is plunger displacement, read from the closed position;
M is the sum of masses, the plunger mass and that mass equivalent to the spring;
t is the time of the displacement;
f is a damping coefficient depending quadratically to the displacement velocity;
Z is spring tension;
p is current pressure in the valve chamber;
F is a plunger area;
V is a current volume of the valve chamber;
Q is mean fluid consumption through the valve;
$x_o$ is the plunger displacement at the above consumption;
E is fluid elastic modulus.

To consider the equivalent mass ($m_e$) of the spring, the displacement velocity of individual spring sections can be, with sufficient accuracy, assumed as changeable directly proportionate to the displacement from zero at the retainer up to the maximum at the plunger.

Because the kinetic energy ($0.5m_e v_m^2$) of the equivalent mass, and that energy $$\left(.5m_s 1^{-1} \int_O^1 v_m^2 1^{-2} x^2 dx\right)$$

of the spring actual mass ($m_s$) are equal, $$m_e = \tfrac{1}{3} m_s,$$

where
$v_m$ is maximum plunger velocity;
1 is spring length with consideration of preliminary tightening of the spring.

Over the operating valve frequency range and displacement, the quadratic dependence of the damping coefficient can be approximated with the linear coefficient.

Therefore, the simultaneous solution of equations (1,2) gives us:

$$\frac{d^3x}{dt^3} + \frac{f_1}{m} \cdot \frac{d^2x}{dt^2} + m^{-1}(Z + \quad (3)$$

$$F^2EV^{-1})\frac{dx}{dt} + \frac{FEA}{Vmx_o} x = 0,$$

where $f_1$ is the approximated damping coefficient.

As the coefficients of the equation (3) are positive, the process has an oscillating nature.

From Hurvits's criterion, the self-oscillations are stable if $$f_1 x_o(ZVE^{-1} + F^2)(mQF)^{-1} > 1. \quad (4)$$

From the above inequality, it is not difficult to choose the stiffness and preliminary tightening of the spring, fluid consumption and the area and the stroke of the plunger to obtain the steady-state oscillations.

As the atomized (and, in many cases, heated) jet, which is also heated because of throttling in the nozzle, is available, and atomization and heating are the principal mechanisms that prevail in many known degassing processes, it is easy to drive off gaseous (air, carbon and sulphur oxides) and liquid-in-vapor form (moisture and gasoline) contaminants, when the fluid is atomized in the tank.

In this case, decreasing solubility under falling pressure in the jet, elevating temperature, increasing free liquid surface and agitation, which brings gases to the surface, are used.

The tank, with the device installed, can be connected to the vacuum system of the engine or the compressor. In this case, the volatiles are drawn off under negative pressure into the vacuum system. There, they can be mixed with the gasoline in the carburetor and discharged as exhaust.

However, it should be taken into account, that connecting the tank with the vacuum system deteriorates the pump suction of the fluid system.

The most degassing effect in engines is achieved if the atomizing device is installed into an outlet-of-engine lubrication line, as here the fluid has saturated gaseous contaminants from the engine.

Figure 14:
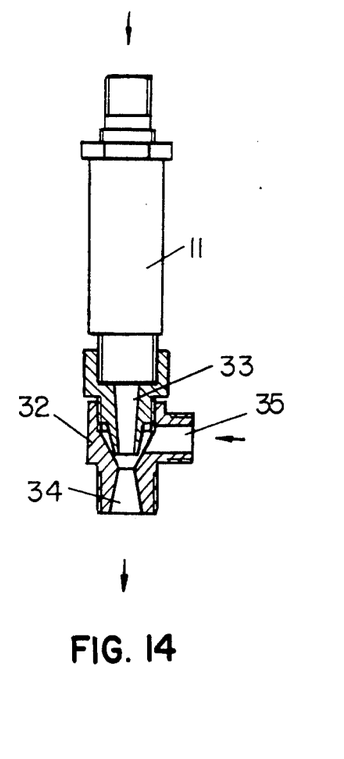
FIG. 14 is the installation of a destroying-dispersing device into a pump inlet.

Another utilization of the jet is increasing the pressure of the pump suction (FIG. 14). Here the atomizing device 11 is installed into an ejector 32.

The fluid from the drain line of the system enters the device 11 and comes out through a nozzle 33 to the pump. Because of the velocity head, some added fluid is drawn out to the suction port 34 of the pump from the port 35 connecting with the tank.

Figure 15:
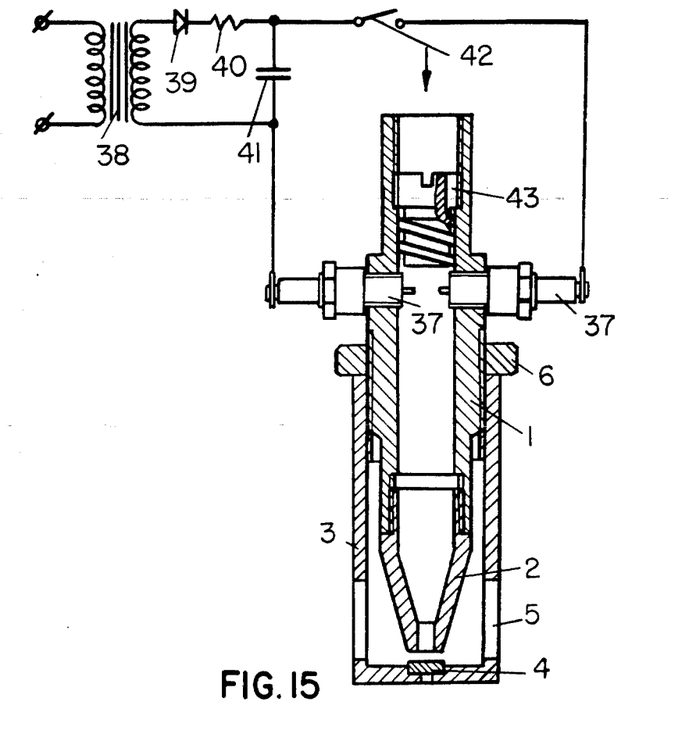
FIG. 15 is the design of an electrodischarging jet device.

In some cases it is possible to use electrodischarging means to create the jets (FIG. 15).

Into a body 1, provided with a nozzle 2, a tip 3, a plate 4, slots 5 and a locknut 6, electrodes 37 connecting an electrodischarging scheme are placed. The latter, in the most common case, consists of a transformer 38, a diode 39, a resistor 40, a capacitor 41 and a switch 42.

The electrical discharge causes pressure waves to be sent through the fluid entering the body 1 via a screw throttle 43, and their impact produces the powerful jets impinging against the plate 4.

As hydraulic resistance of the throttle adheres to the quadratic law of the stream velocity, the throttle exhibits a little resistance to the constant stream and the very high resistance to the impact wave propagation. That is why, the fluid system is prevented from having too high pressure.

Figure 16:
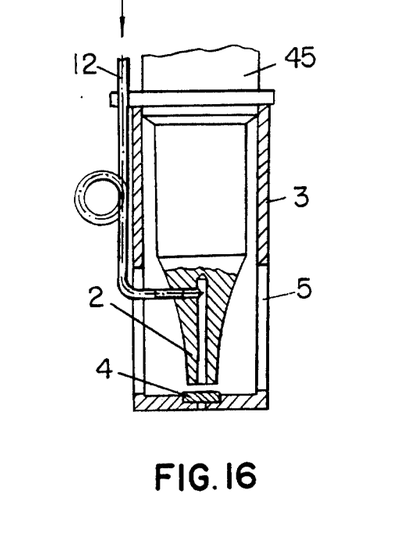
FIG. 16 is the design scheme of a device with ultrasonic producing of jets.

Another means of jet creation is the ultrasonic transducer 45 with a bored nozzle 2, a tip 3, a plate 4 and slots 5 (FIG. 16).

The fluid enters the vibrating transducer 45 and the nozzle 2 from a pipe 12, with a spiral turn (because of the oscillations of the transducer). The static fluid stream is broken up by the high instantaneous accelerations obtainable by ultrasonics into a series of jets separated by a distance of twice their own length (since injection occurs only over approximately one third of a cycle and impinging against the plate).

The vibrating transducer exerts a radiation pressure within the fluid drops resting (relatively) in the column of the fluid fed into the transducer on a continuous basis. Besides the radiation pressure, cavitation occurring as a result of the passage of ultrasonics causes the jet production (the cavitation phenomena will be explained below).

Figure 17:
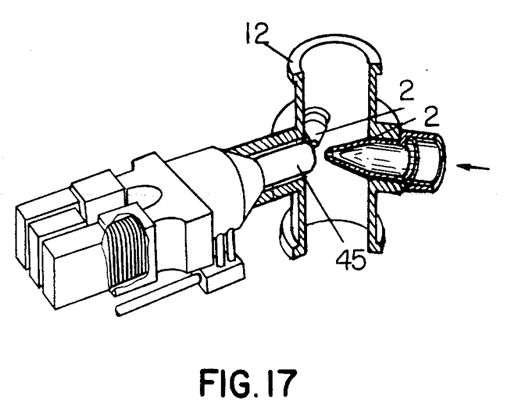
FIG. 17 is the design scheme of a device with an ultrasonic active surface.

In the device (FIG. 17), the destruction and dispersion of the solid contaminants are created by directing a relatively weak fluid stream against the active surface of an ultrasonic transducer 45. The latter and nozzles 2 are installed into a return line 12.

If the transducer is surrounded by fluid, the physical changes induced by intense ultrasonic radiation are caused by heat, cavitation, steady ultrasonic forces (which are weak compared with the cavitation forces) and large mechanical stresses (which may be due to cavitation or directly associating with ultrasonic waves).

The solids suspended in the fluid scatter some of the incidental radiation, thereby giving rise to an energy density gradient across themselves. If these solids are smaller than a wavelength, the resulting radiation pressure is small (unless they are in a standing wave system and tend to accumulate there in bands situated half a wavelength apart).

Besides an alternating wave force, the solids are subjected to a steady force which arises since fluid viscosity does not remain constant over a pressure cycle with temperature variations.

The motion of the particles depends on their size and mass (the larger particles oscillate with a smaller amplitude). This amplitude difference also increases probability of mutual collision of the solids.

Figure 18:
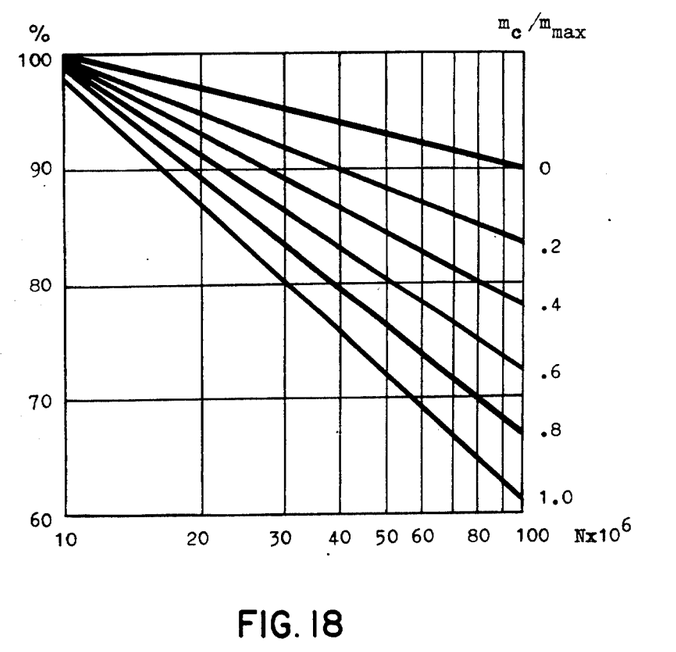
FIG. 18 is an exemplary graph of percentage decreasing fluid viscosity according to the quantity (N) of pressure oscillations and to a current-quantity ($m_c$)-of-viscous-additive-to-maximum-one ($m_{max}$) relationship.

It should be taken into account that applied throttling with a high pressure difference, vibration (especially with ultrasonics) and cavitation cause molecular-structural breaking down of some fluids (particularly those with viscous additives consisting of long hydrocarbonic chains). This is accompanied by decreasing viscosity and the deterioration of lubricant properties (FIG. 18).

In the ultrasonic devices (FIG. 16, 17), the desirable effect is produced mainly by activating the jet or (and) the solid surface. Cavitation does not have much affect because of the reason explained below.

The effect can also be achieved only by means of cavitation occurring in liquid when local pressure reduces below the gas vapor pressure. If formed cavities (gas vapor bubbles) are subjected by a higher pressure, they collapse, since the vapor within them condenses and gas dissolves.

During this process, fluid particles move to the bubble center with great speed. As a result, the kinetic energy of the colliding particles causes local hydraulic impacts accompanied by high temperature and pressure sufficient to damage the hardest material of the solid boundaries exposed to the collapsing cavities.

At high temperature, chemical acting bubbles of atmospheric oxygen (the dissolved air contains 1.5 times more oxygen), electrolitic effect and oscillations fatigue the material. In addition, hydraulic microimpacts destroy the oxidation film, which delays metal oxidation in usual conditions.

For the bubble formation, a nucleus is required. It may be a small bubble already existing in the liquid, a small pocket of gas in a crack in the solid contaminant or on the wall of the vessel, some defect or void in the structure of the liquid, etc.

Thus the contaminants are the nuclei of cavitation, and it is very tempting to utilize this phenomenon for their destruction. In this case, the pressure pulses are generated right where they are needed (on surfaces of the solid contaminants). This provides the cavitating devices for improving fluid systems with a great advantage, because the energy for their destruction is transferred directly to the contaminant and a minimum of effective pressure is lost by divergence of energy. The required one is relatively modest, but concentrated over a small area and produces very high local stresses (the peak erosion intensity and jet power vary respectively with the sixth power and the cube of the jet velocity).

It should also be mentioned that in the jet non-ultrasonic devices (see above) the used velocities of the jet impinging against a rigid surface may develop a pressure not higher than the strength of the solid particles, and in this case, erosion is caused by cavitation too.

Ventilation of cavities can be used for eliminating volatile contaminants by the same ways as it has been explained before. But this ventilation decreases pressure of collapsing. That is why the selection of necessary equipment depends on the most desirable effect required.

When cavitation occurs in the jet surrounded by the atmosphere (as, for instance, in the ultrasonic devices on FIGS. 16, 17), the air tends to leak into the jet and cushions the collapse, the shock and destructive force are consequently decreased. For this reason cavitation in these devices is not the deciding factor in comparison with the mechanical destruction. To increase the latter, it is necessary to prevent ventilation of the cavities. By submerging the fluid jet into a relatively stationary body of liquid, venting the fluid jet into the atmosphere is virtually eliminated.

In engine lubrication systems, if the deciding factor is cavitation erosion of the solid contaminants (but not eliminating the gaseous ones), the cavitation devices should be installed into the engine inlet (compare with the above indications in reference to the degassing installation).

Cavitation can be produced by a variety of ultrasonic and hydrodynamic methods forming regions of rarefaction and compression. Besides the ultrasonic devices (FIGS. 16, 17) working in a submerged regime, the fluid to be improved upon can be ultrasonically treated in the tanks on sufficiently flexible sides or the bottom of which an ultrasonic transducer is mounted (such ultrasonic installations are used, for example, for ultrasonic cleaning). Also, this can be done in the available ultrasonic homogenization and emulsification equipment with fluid flowing through a container surrounding the tip of the horn.

More convenient, however, are the known ultrasonic whistle and the like jet ultrasonic generators, which outwardly look like the device shown in FIG. 2 and, consequently, can be installed into the fluid system or the separate arrangement exactly by the same way (FIG. 3, 5–10,14). But a fatigue failure in the vibrating blade of the whistle is inevitable.

Other existing hydrodynamic oscillators and cavitation generators can be used also, for example, tubular rotor-stator devices with narrow slots parallel with the working axis. However, in this case, most of the breaking down is produced by the high speed cutting of the suspended particles by the port edges in the small clearance (about 0.002 mm) between the rotor and stator.

In many cases the best way to produce cavitation is by non-ultrasonic devices (which can work at supercavitation regime with the minimum wearing of working surfaces).

The submerged jet produces cavitation at the velocity $$v = \frac{[2(p_{min} - p_s)]^{.5}}{\sigma \rho}, \tag{5}$$

where
$p_{min}$ is minimum pressure;
$p_s$ is the sum of pressures of the dissolved gas and saturated vapor;
$\rho$ is liquid density;
$\sigma$ is cavitation number.

The force of the jet creates a high turbulent zone with a multitude of vortices around the periphery of the jet and shears the surrounding fluid. Low pressures in the centers of the vortices decrease below the vapor gas pressure and additional cavities (vortex cavitation) are formed there, increasing the erosion and the dispersion effects.

Figure 19:
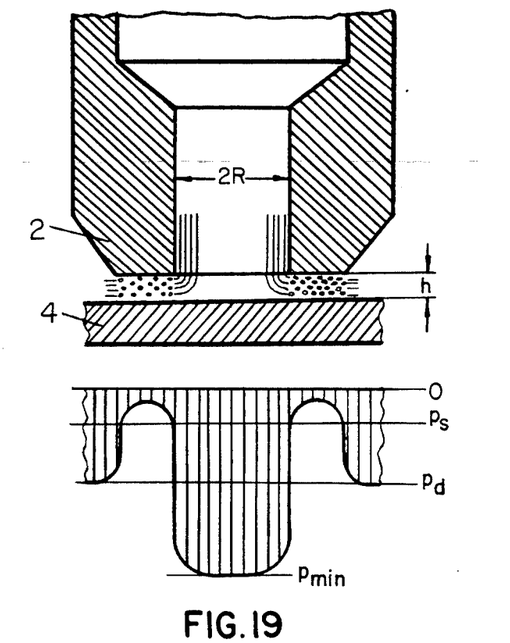
FIG. 19 is the schematic diagram of the cavitation process in a nozzle-plate gap.
Figure 20:
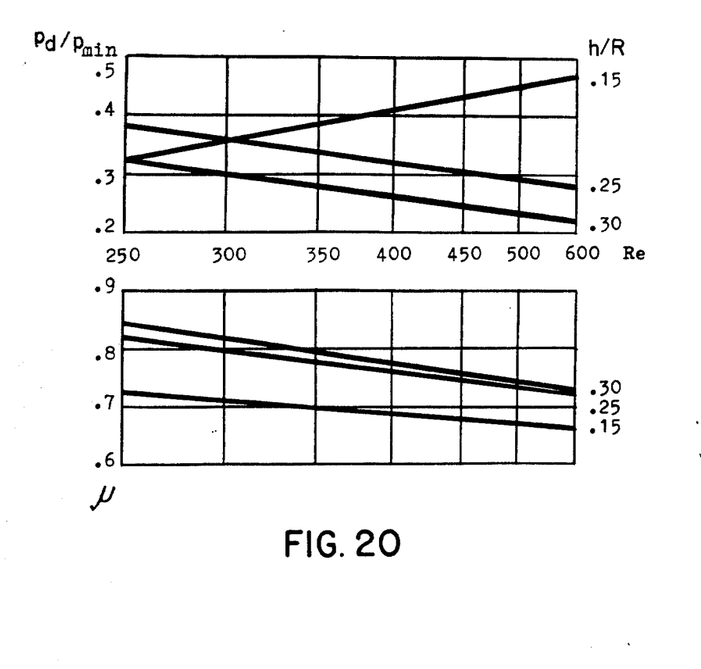
FIG. 20 is an exemplary graph of drainage-to-minimum pressure relationship ($p_d/p_{min}$), the gap-to-nozzle one (h/R) and discharging coefficient ($\mu$) according to Reynolds number (Re) in the nozzle-plate gap.

Also, cavitation can be produced in the nozzle plate gap (FIG. 19) at $$h < 0.5R \text{ (e.g. } 0.1R > h > 0.01R); \tag{6}$$

$$v \gtrsim [2p_s\mu \text{ (Re, h)}/\rho]^{0.5}, \tag{7}$$

where
h is the gap;
R is the nozzle orifice radius;
$\mu$ is discharge coefficient, depending on h and Reynolds number Re (FIG. 20).

In many cases, cavitation can arise in regions below curves $p_d/p_{min}$ (FIG. 20) at $$Re = 2h[2(p_{min} - p_d)/\rho^{0.5}/\gamma \; 250, \tag{8}$$

where
$p_d$ is drainage pressure;
$\gamma$ is kinetic viscosity of the fluid.

Figure 22:
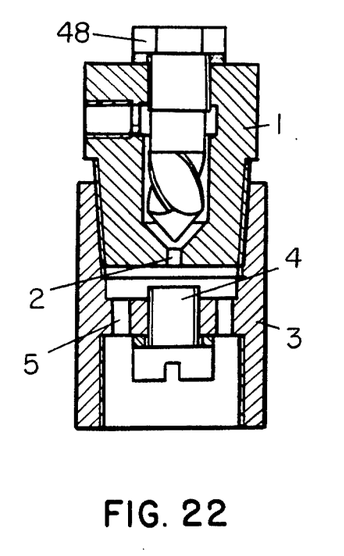
FIG. 22 is the same with a spiral core.
Figure 23:
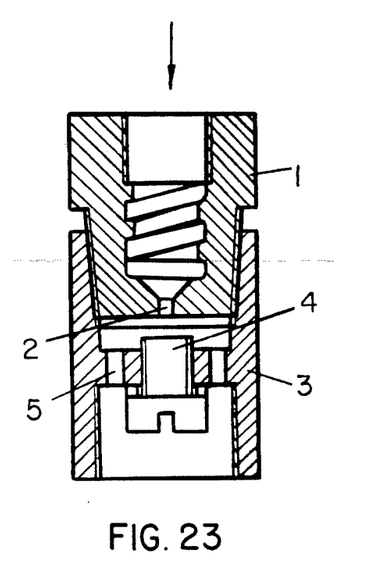
FIG. 23 is the same with a spiral thread.

Vortex cavitation can be obtained also by means of a nozzle 2 with either a swirl volute inlet (FIG. 21) or a spiral core 48 (FIG. 22), or a thread (FIG. 23). But in this case, collision with the plate is deteriorated as it was explained before.

Also, cavitation can be produced in the device (FIG. 11) by appropriately increasing the impeller angular speed and the hydraulic resistance of the inlet.

It should also be mentioned that vapor gas recesses are formed by the electrodischarging device (FIG. 15) and the pulsating one (FIG. 13), providing flow continuity disturbance.

The bubble cavitation (producing the vapor gas liquid mixture) and the cloudy one (pulsating bubble systems and dispersed fluid drops) arise at $1 > \sigma > 0.5$. These two cavitation forms create erosion, noise and vibration of the equipment. The most radical means of fighting against this cavitation damage is transition into supercavitation regime (sheet cavitation with sharp interface between vapor gas and fluid phases) with cavities closing behind the nozzle, but not on the plate ($\sigma < 0.5$).

Figure 24:
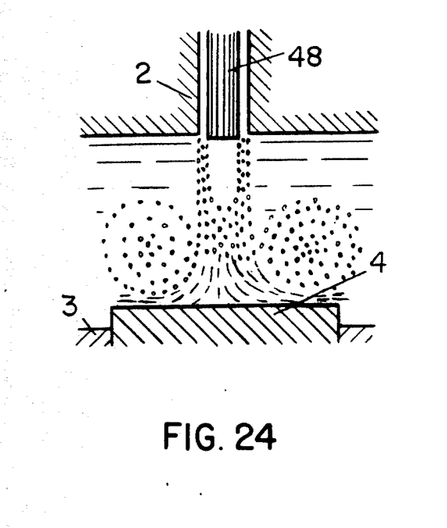
FIG. 24 is the schematic diagram producing cavitation in a nozzle with a core cavitator.
Figure 25:
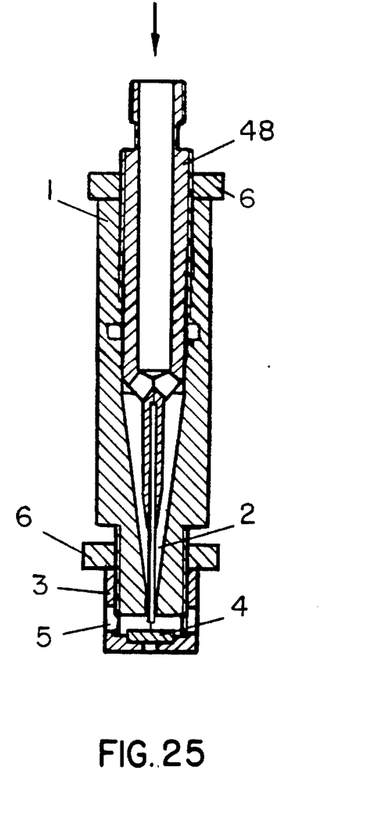
FIG. 25 is the design of a device with the above scheme.

The supercavitation regime can be easily achieved by placing a core cavitator 48 into the orifice of the nozzle (FIGS. 24, 25).

Cavities in the fluid cause the clear opening to become overloaded (the constraint of the flow) and create additional hydraulic resistance. Neglecting secondary cavitation effects (foaming, vortices, etc.) the fluid is considered to flow through the reduced area ($F_r$) of the device $$F_r = (1 - \alpha)F_v, \tag{9}$$

where
$\alpha$ is the parameter characterizing cavitation development;
$F_v$ is the outlet area.

For the device (FIG. 15), the quantity of impeller revolutions per minute ensuring cavitation regime is $$n = 19.1v/D = 27.9(p_{min} - p_s)^{0.5}(\rho\sigma D^2)^{-0.5}, \quad (10)$$

where D is the impeller diameter.

At the cavitation regime, to the working power (considered by the known expressions), the power (N) spent because of the flow constraint with cavities is added:

$$N = vpF_r = 0.5v^3\rho F_r, \quad (11)$$

where p is the pressure drop in the nozzle or the pump pressure of the impeller.

With high speed rotation, the impeller may uncover itself and part of the fluid may splash out of the tank (providing there is no lid.). These phenomena are accordingly eliminated at $$h_t - h_o \leq 7 \times 10^{-5} n^2 R_t^2/g \leq H - h_t, \quad (12)$$

where
- $h_o$ is the distance between the tank and the impeller;
- $h_t$ is the height of fluid level in the tank;
- $R_t$ is the tank radius;
- H is the tank height;
- g is gravity acceleration.

In Bernoulli's equation, impeller inlet vacuum pressure can be, with sufficient accuracy, calculated without taking into account the non-uniformity of fluid velocity distribution:

$$p_v = \rho[h_t/g + 0.5v^2(1 + \xi)] \quad (13)$$

where $\xi$ is coefficient of losses in the impeller inlet.

Figure 21:
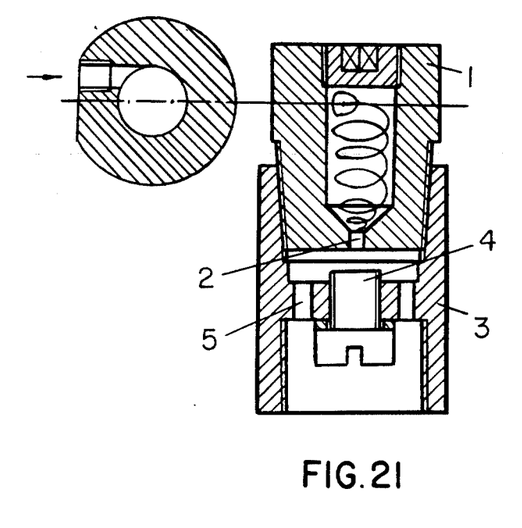
FIG. 21 is the design of a device producing cavitation in a nozzle with a swirl inlet.

If $\xi$ is great, cavitation can arise in the inlet. Since the latter is ventilated, the erosion effect is small, but degassing is significant. Besides, this inlet cavitation causes pulsing jets (and may produce cavitation in the nozzle too). In supercavitation regime, this pulsation depending on the pulsation of the large stable cavitation bubble, is very stable. The same is true for vortex cavitation, if it arises in the inlet of the vortex nozzles (FIGS. 21-23). Thus cavitation in the inlet is another means to pulse the jet.

Any cavitation process is temperature dependent because it depends on the fluid temperature dependent characteristics. Those of vapor pressure, surface tension, the diffusion rates of dissolved-in-liquid gases, and chemical activity of fluid increase when the temperature is raised, with the solubility of gases in the liquid decreasing.

The temperature rise may, at first, lower the cavitation threshold and thereby intensify the cavitation. The gas content of fluid reduces as the temperature rises and increases bubble compressibility and shock pressure. These actions provoke still more erosion intensification. However, further temperature rise increases the pressure of saturated vapor and lowers the pressure impact of slamming cavities.

These contrary effecting factors cause the optimal temperature interval of cavitation processes.

This internal is true for electrodischarging devices also, not only because of forming the cavitation bubble, but because the primary shock wave pressure heightens due to the rising elastic modulus in degassed fluid.

The dissolution of the air being lower in organic-origin fluids (kerosene—1.25 times, oil—1.8 times, benzene—10 times), than in water, and vapor pressure and surface tension being higher (alcohol and petroleum—3 times, oil—2), the pressure of cavitation microimpacts and erosion in water is higher (in comparison with kerosene at the optimal temperature—2 times, benzene—5, alcohol and acetone—6).

Higher viscosity liquids slow up the rate of bubble growth and lower cavitation intensity (also, because they have more dissolved air).

Liquids of higher density show greater inertion and lower cavitation erosion too.

If hydrostatic pressure rises, cavitation slamming pressure and erosion increase. However, sufficiently high pressure can suppress cavitation by rising the cavitation threshold too high. The optimal pressure interval is 3-5 kgf.cm$^{-2}$.

It can be seen that the cavitation process is determined by many factors with complicated dependencies. That is why the investigation of the cavitation process cannot give quantitative data of technological efficiency and erosion intensity. This investigation only points out the qualitative nature of the process.

It is to be understood that this description is exemplary and explanatory, but not restrictive. Also, the invention is not limited to the specific details shown and described. Departures may be made without departing from the scope of the invention and without sacrificing its chief advantages.

I claim

1. A method of improving the working properties of a closed circulating hydraulic system in which solid contaminants are produced through operation of the system, the method including the steps of breaking down the contaminants of said liquid by means of cavitation erosion to a size not interfering with the operation of the hydraulic unit, and retaining the broken down contaminants in the operating system and recirculating the borken down contaminants through the hydraulic units.

2. A method of improving the working properties of a closed circulating hydraulic system in which solid contamiants are produced through operation of the system, the method including the steps of breaking down the contaminants of said liquid by means of mutual colliding solids to a size not interfering with the operation of the hydraulic unit, and retaining the broken down contaminants in the operating system and recirculating the broken down contaminants through the hydraulic units.

3. A hydraulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet, and a solid surface against which the latter is collided, and said surface is activated by an ultrasonic transducer.

4. A hydradulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet, and a solid surface against which the latter is collided, and said nozzle is mounted in a revolving impeller submerged in the liquid and surrounded by said solid surface shaped as a cylinder.

5. A hydraulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet, and a soild surface against which the latter is collided, and said nozzle is mounted in an ultrasonic transducer.

6. A hydraulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet, and a solid surface against which the latter is collided, and said nozzle is provided with an electrodischage gap for pressurizing the liquid through the nozzle.

7. A hydraulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet with a velocity sufficiently high to cause cavitation.

8. The system defined in claim 7 wherein said nozzle has a swirl inlet.

9. The system defined in claim 7 wherein said nozzle has an inner spiral thread.

10. The system defined in claim 7 wherein in said nozzle a spiral core is installed.

11. The system defined in claim 7 wherein said nozzle is shaped as a ring slot.

12. A hydraulic system including a hydraulic unit, lines, a working liquid and a means for maintaining the working properties of the latter, wherein said means constitute a device for breaking down the solid contaminants of the liquid into particles of a size not interfering with the hydraulic unit and retaining said particles in said working liquid and recirculating said particles through said hydraulic unit, said device including a nozzle to form a high-speed jet, and a solid surface against which the latter is collided, and said nozzle and surface being installed with a small clearance between them to cause cavitation in the gap.

* * * * *